US012754075B2

(12) United States Patent
Shirokawa et al.

(10) Patent No.: US 12,754,075 B2
(45) Date of Patent: Oct. 6, 2026

(54) BODY AND ELECTROMAGNETIC WAVE SENSOR

(71) Applicant: TDK CORPORATION, Tokyo (JP)

(72) Inventors: Maiko Shirokawa, Tokyo (JP); Shinji Hara, Tokyo (JP); Naoki Ohta, Tokyo (JP); Kazuya Maekawa, Tokyo (JP); Susumu Aoki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 637 days.

(21) Appl. No.: 17/890,989

(22) Filed: Aug. 18, 2022

(65) Prior Publication Data

US 2023/0062983 A1 Mar. 2, 2023

(30) Foreign Application Priority Data

Aug. 30, 2021 (JP) ................................ 2021-139790

(51) Int. Cl.
*G01J 5/20* (2006.01)

(52) U.S. Cl.
CPC ........... *G01J 5/20* (2013.01); *G01J 2005/202* (2013.01)

(58) Field of Classification Search
None
See application file for complete search history.

(56) References Cited

U.S. PATENT DOCUMENTS

| | | | | |
|---|---|---|---|---|
| 7,002,153 B1 | 2/2006 | Gillham et al. | |
| 2011/0180713 A1* | 7/2011 | Noda ........................ | G01J 5/34 250/338.4 |
| 2014/0048708 A1 | 2/2014 | Ouvrier-Buffet et al. | |
| 2020/0240836 A1* | 7/2020 | Becker ...................... | G01J 1/04 |
| 2020/0408604 A1 | 12/2020 | Ohta et al. | |

FOREIGN PATENT DOCUMENTS

| | | | |
|---|---|---|---|
| JP | 2002365129 A | * | 12/2002 |
| JP | 3644411 B2 | * | 4/2005 |
| JP | 2009031197 A | * | 2/2009 |
| JP | 2013-217786 A | | 10/2013 |
| WO | 2019/171488 A1 | | 9/2019 |

* cited by examiner

*Primary Examiner* — Marcus H Taningco
(74) *Attorney, Agent, or Firm* — Oliff PLC

(57) ABSTRACT

The present disclosure includes an electromagnetic wave detector, and a pair of arms that are positioned on both sides with the electromagnetic wave detector interposed therebetween. The electromagnetic wave detector includes a temperature detection element, and electromagnetic wave absorbers which cover at least a part of the temperature detection element. The structure body has a structure in which the electromagnetic wave detector is hung or suspended with respect to a substrate facing the electromagnetic wave detector via the pair of arms. Area of a surface of the pair of arms on a side facing the substrate are larger than area of surface thereof on a side opposite to the side facing the substrate.

6 Claims, 10 Drawing Sheets

BODY AND ELECTROMAGNETIC WAVE SENSOR

CROSS-REFERENCES TO RELATED APPLICATIONS

This application relies for priority upon Japanese Patent Application No. 2021-139790, filed on Aug. 30, 2021 the entire content of which is hereby incorporated herein by reference for all purposes as if fully set forth herein.

BACKGROUND

The present disclosure relates to a structure body and an electromagnetic wave sensor.

For example, there is an electromagnetic wave sensor using an electromagnetic wave detector such as a thermistor element. The electrical resistance of a thermistor film provided in a thermistor element varies in accordance with a variance in temperature of the thermistor film. In the electromagnetic wave sensor, infrared rays (electromagnetic waves) incident on the thermistor film are absorbed by the thermistor film or materials around the thermistor film so that the temperature of this thermistor film varies. Accordingly, the thermistor element detects infrared rays (electromagnetic waves).

Here, according to the Stefan-Boltzmann law, there is a correlation between the temperature of a measurement object and infrared rays (radiant heat) discharged from this measurement object due to heat radiation. Therefore, the temperature of a measurement object can be measured in a non-contact manner by detecting infrared rays discharged from the measurement object using a thermistor element.

In addition, in such a thermistor element, thermistor elements are arranged in an array to be applied to an electromagnetic wave sensor such as an infrared image capturing element (infrared image sensor) detecting (capturing an image of) a temperature distribution of a measurement object in a two-dimensional manner (for example, refer to the following Patent Document 1).

PATENT DOCUMENTS

[Patent Document 1] PCT International Publication No. WO 2019/171488

SUMMARY

Incidentally, in order for the electromagnetic wave sensor described above to perform highly accurate sensing, it is preferable that the thermistor element (electromagnetic wave detector) be thermally insulated from surrounding parts as much as possible. On the other hand, in order to enhance heat insulating properties between the thermistor element and surrounding parts thereof, improvement can be achieved by thinning a pair of arms connected to the thermistor element so far as possible. However, if the arms are thinned, efficiency of absorption of electromagnetic waves in the arms deteriorates.

It is desirable to provide a structure body capable of curbing heat conduction of arms and enhancing efficiency of absorption of electromagnetic waves in the arms, and an electromagnetic wave sensor including such a structure body.

The following means are provided.

A structure body includes an electromagnetic wave detector, and a pair of arms that are positioned on both sides with the electromagnetic wave detector interposed therebetween. The electromagnetic wave detector includes a temperature detection element and an electromagnetic wave absorber which covers at least a part of the temperature detection element. The structure body has a structure in which the electromagnetic wave detector is hung or suspended with respect to a substrate facing the electromagnetic wave detector via the pair of arms. Area of a surface of the pair of arms on a side facing the substrate is larger than area of a surface thereof on a side opposite to the side facing the substrate.

An electromagnetic wave sensor includes at least one structure body mentioned above.

DETAILED DESCRIPTION

Figure 1:
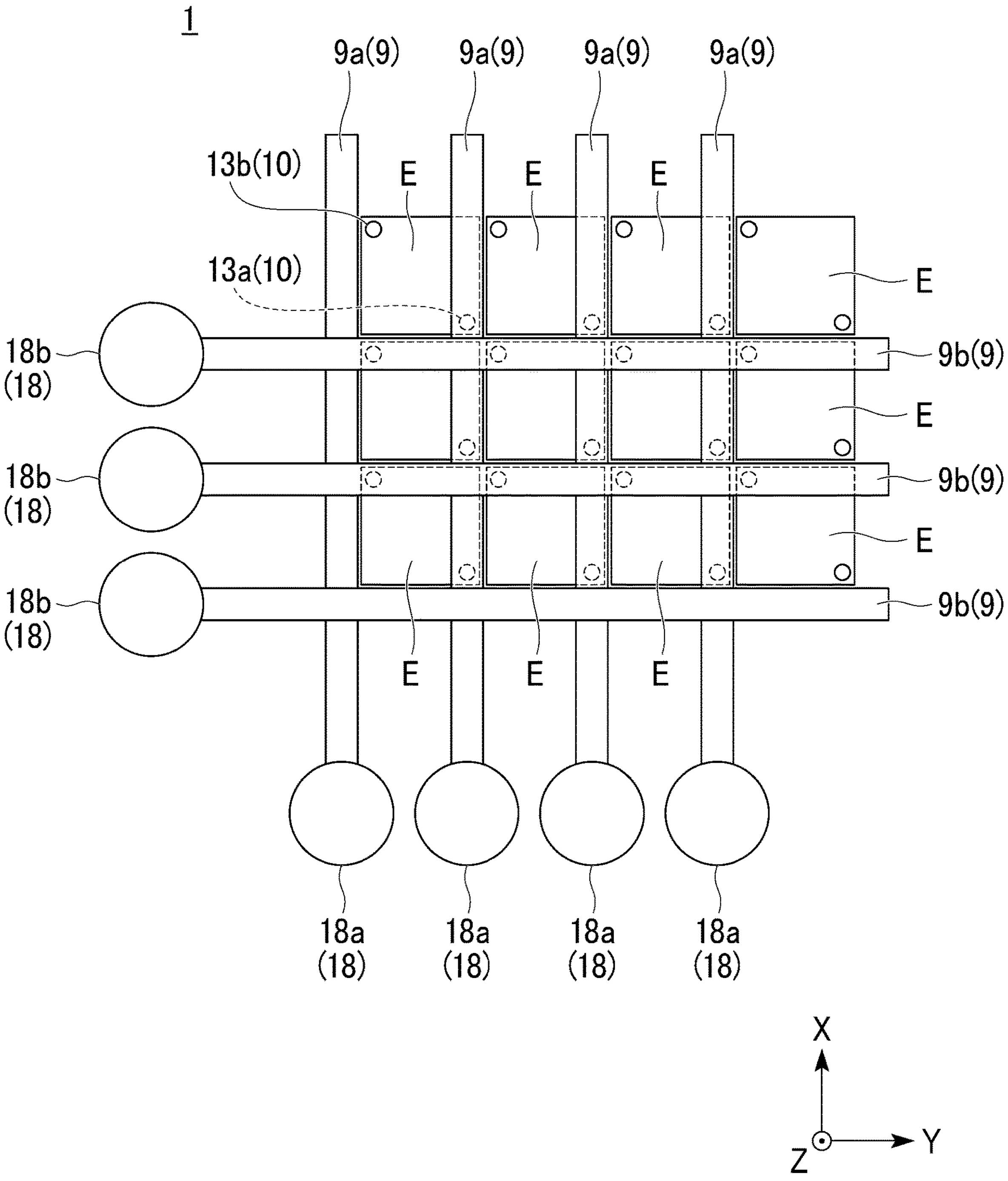
FIG. 1 is a plan view illustrating a constitution of an electromagnetic wave sensor according to an embodiment of the present disclosure.

Hereinafter, an embodiment of the present disclosure will be described in detail with reference to the drawings.

In the drawings used in the following description, in order to make each of constituent elements easier to see, scales of dimensions may differ depending on the constituent element, and it is assumed that dimensional ratios and the like of each of the constituent elements are not always the same as the actual ratios thereof. In addition, materials and the like exemplified in the following description are examples, and the present disclosure is not necessarily limited thereto. The present disclosure can be suitably changed and performed within a range not changing the gist thereof.

As above, according to the present disclosure, it is possible to provide a structure body capable of curbing heat conduction of arms and enhancing efficiency of absorption of electromagnetic waves in the arms, and an electromagnetic wave sensor including such a structure body.

In addition, in the following drawings, an XYZ orthogonal coordinate system is set. An X axis direction will be referred to as a first direction X within a particular plane of an electromagnetic wave sensor, a Y axis direction will be referred to as a second direction Y orthogonal to the first direction X within the particular plane of the electromagnetic wave sensor, and a Z axis direction will be referred to as a third direction Z orthogonal to the particular plane of the electromagnetic wave sensor, respectively.

[Electromagnetic Wave Sensor]

First, regarding the embodiment of the present disclosure, for example, an electromagnetic wave sensor 1 illustrated in FIGS. 1 to 5 will be described.

Figure 2:
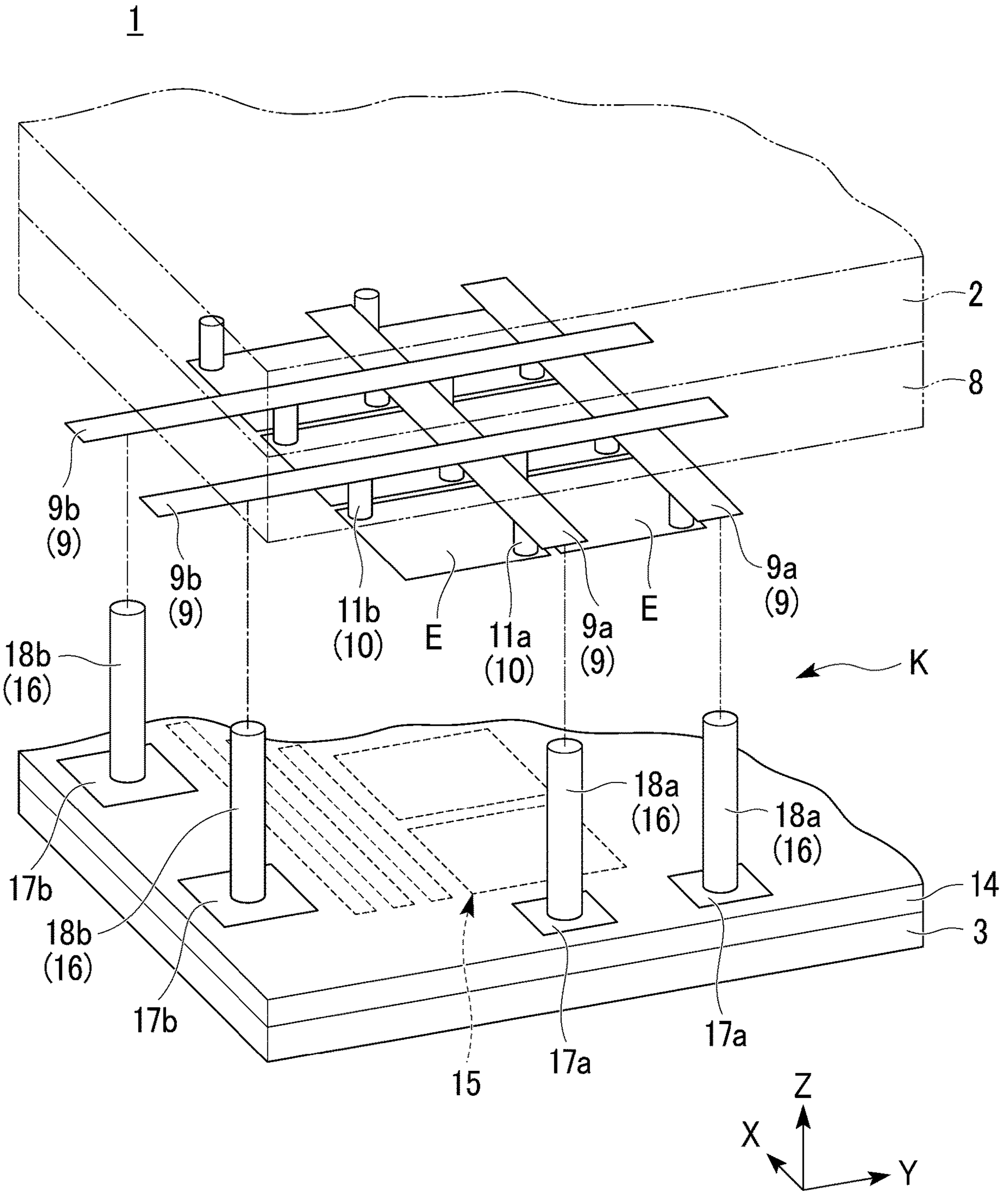
FIG. 2 is an exploded perspective view illustrating a constitution of the electromagnetic wave sensor illustrated in FIG. 1.
Figure 3:
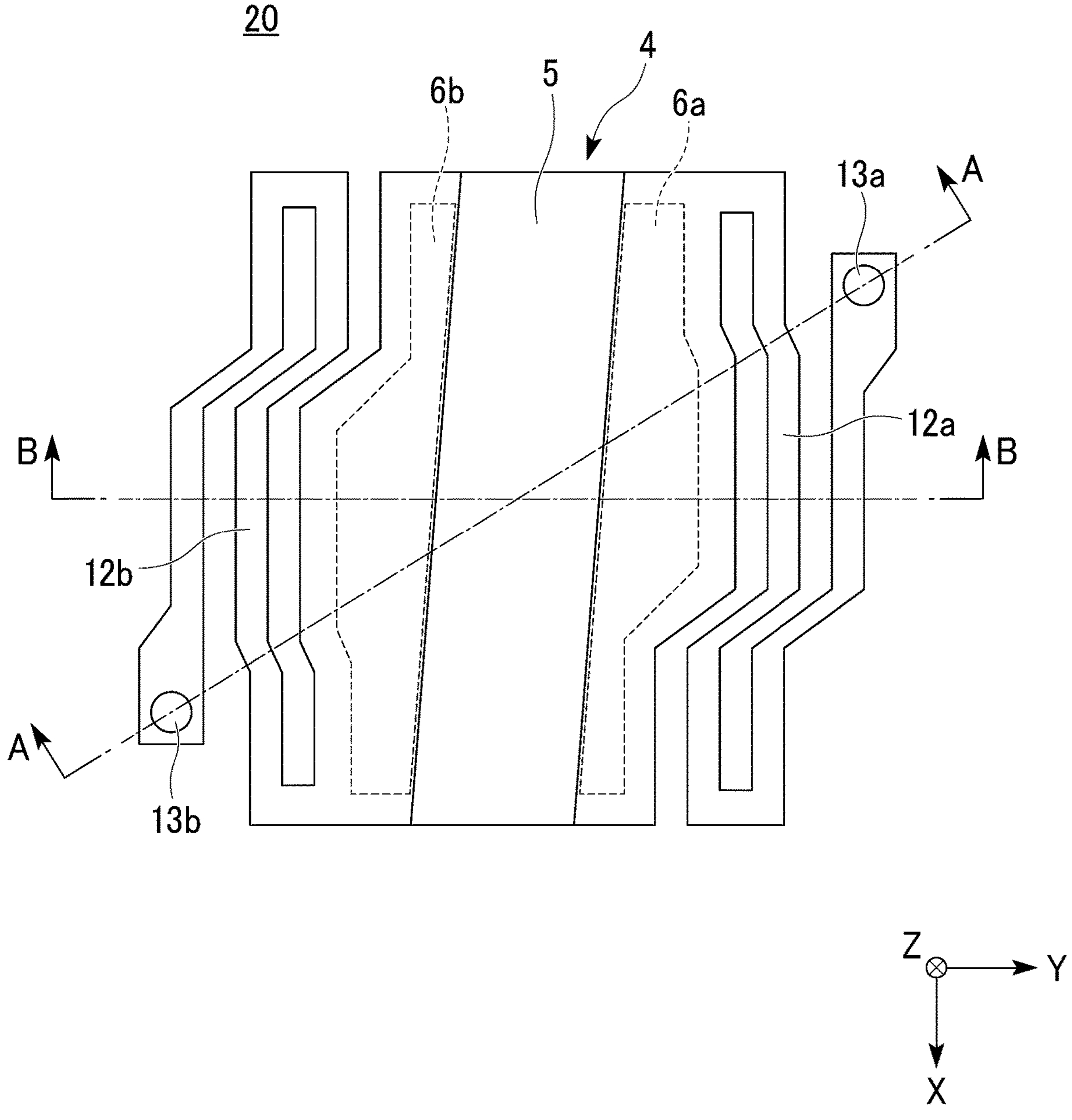
FIG. 3 is a plan view illustrating a constitution of a structure body included in the electromagnetic wave sensor illustrated in FIG. 1.
Figure 4:
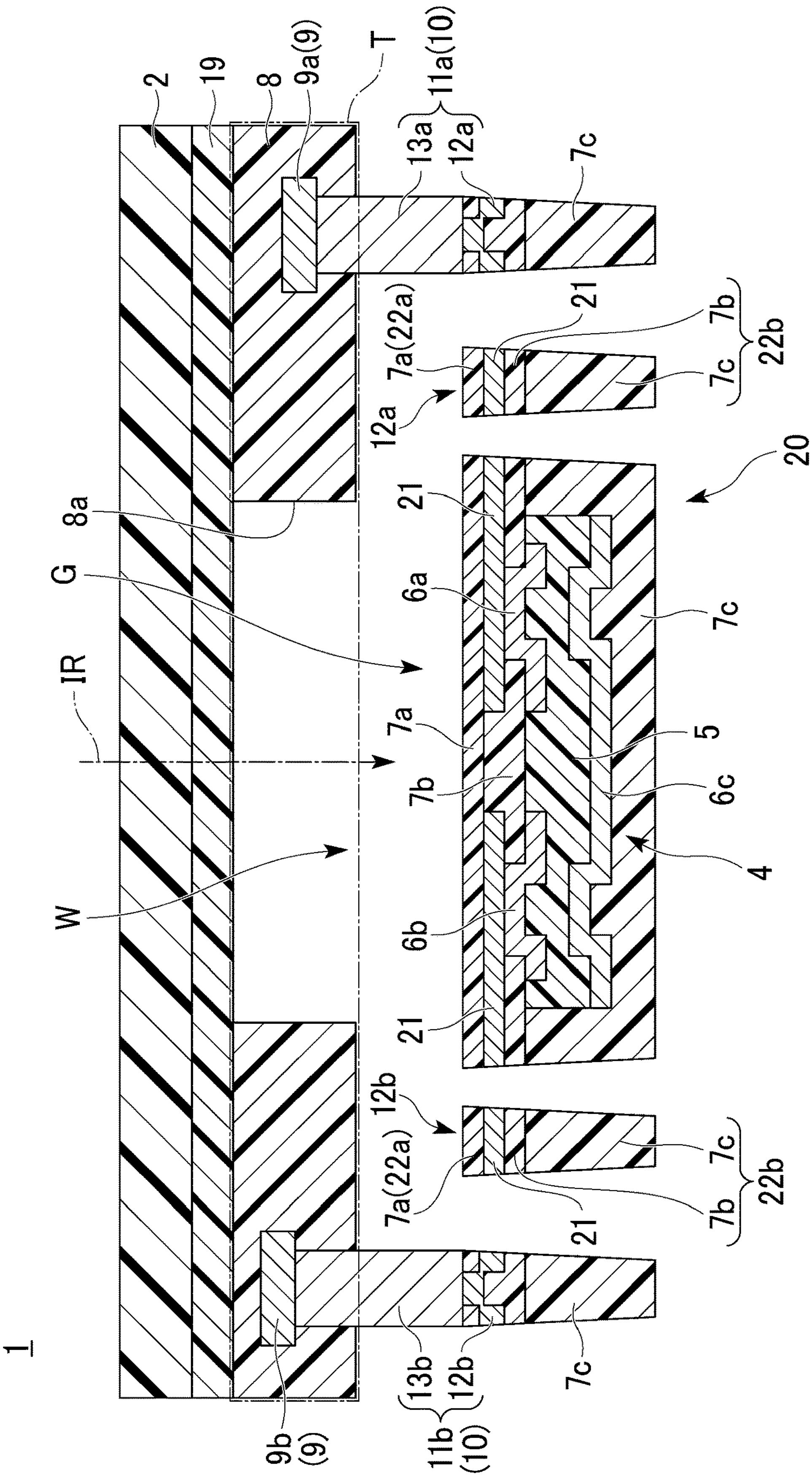
FIG. 4 is a cross-sectional view of the structure body along line segment A-A illustrated in FIG. 3.
Figure 5:
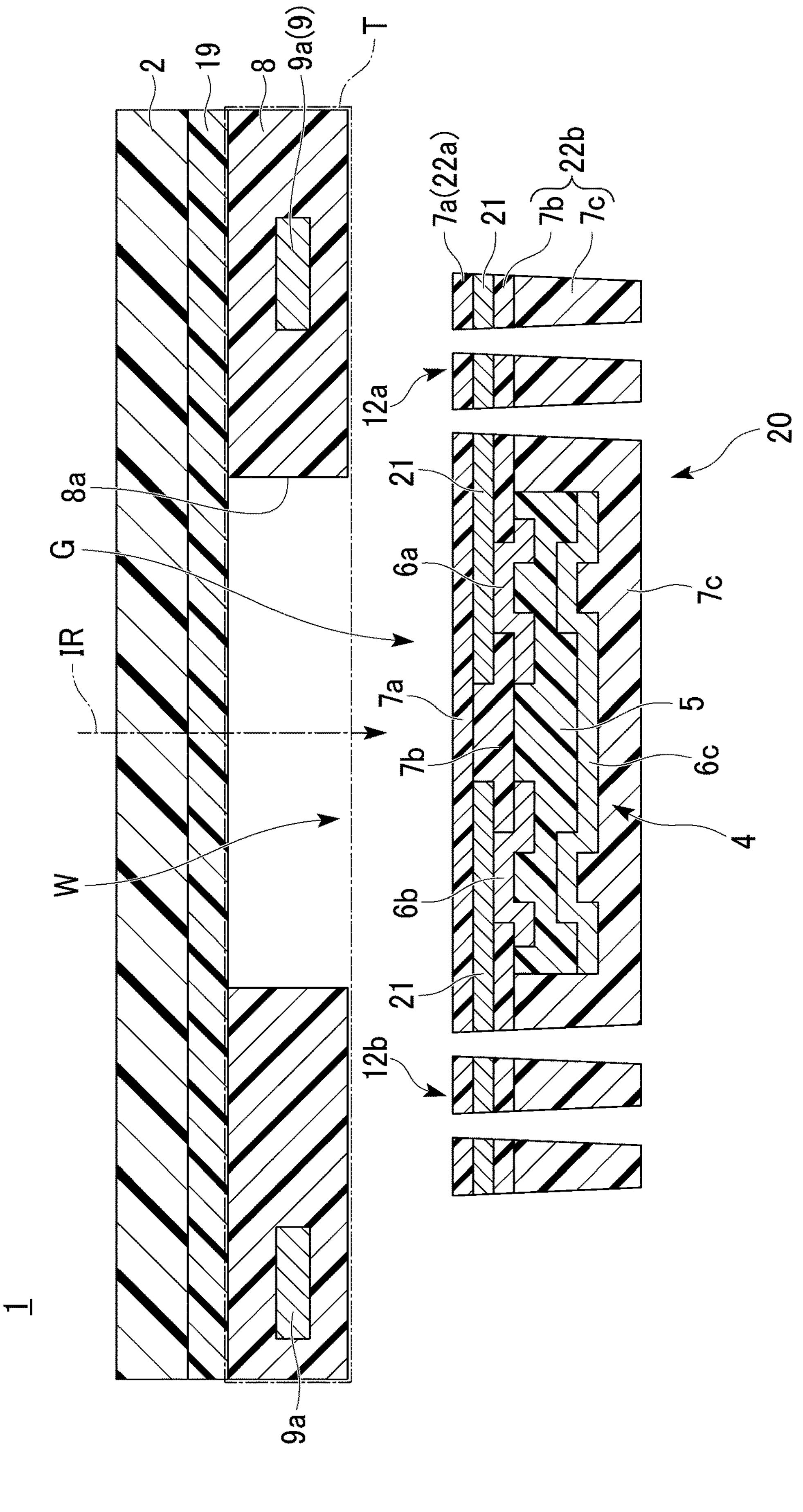
FIG. 5 is a cross-sectional view of the structure body along line segment B-B illustrated in FIG. 3.

FIG. 1 is a plan view illustrating a constitution of the electromagnetic wave sensor 1. FIG. 2 is an exploded perspective view illustrating a constitution of the electromagnetic wave sensor 1. FIG. 3 is a plan view illustrating a constitution of a structure body 20 included in the electromagnetic wave sensor 1. FIG. 4 is a cross-sectional view of the structure body 20 along line segment A-A illustrated in FIG. 3. FIG. 5 is a cross-sectional view of the structure body 20 along line segment B-B illustrated in FIG. 3.

The electromagnetic wave sensor 1 of the present embodiment is a sensor having the present disclosure applied to an infrared image capturing element (infrared image sensor) detecting (capturing an image of) a temperature distribution of a measurement object in a two-dimensional manner by detecting infrared rays (electromagnetic waves) discharged from this measurement object.

Infrared rays are electromagnetic waves having a wavelength within a range of 0.75 μm to 1,000 μm. An infrared image sensor is utilized not only for indoor/outdoor scotopic vision and the like as an infrared camera but is also utilized for temperature measurement and the like of humans and objects as a non-contact-type temperature sensor.

Specifically, as illustrated in FIGS. 1 to 5, this electromagnetic wave sensor 1 includes a first substrate 2 and a second substrate 3 which are disposed such that they face each other, and thermistor elements 4 which are disposed between the first substrate 2 and the second substrate 3.

The first substrate 2 and the second substrate 3 are constituted as silicon substrates having a transparency with respect to electromagnetic waves having a certain particular wavelength, specifically, infrared rays (long-wave infrared rays having a wavelength within a range of 8 to 14 μm, in the present embodiment) IR including a wavelength bandwidth of 10 μm. In addition, a germanium substrate or the like can be used as a substrate having a transparency with respect to the infrared rays IR.

In the first substrate 2 and the second substrate 3, perimeters of surfaces thereof facing each other are sealed using a seal material (not illustrated) so that a hermetically sealed internal space K is constituted therebetween. In addition, the internal space K is depressurized to a high vacuum state. Accordingly, in the electromagnetic wave sensor 1, an influence of heat due to a convection current in the internal space K is curbed, and an influence by heat other than the infrared rays IR discharged from a measurement object with respect to the thermistor elements 4 is eliminated.

The electromagnetic wave sensor 1 of the present embodiment is not necessarily limited to the constitution in which the hermetically sealed internal space K described above is depressurized, and it may be constituted to have the internal space K which is hermetically sealed or open at atmospheric pressure.

Regarding electromagnetic wave detectors, the thermistor elements 4 include a thermistor film 5 which serves as a temperature detection element, a pair of first electrodes 6*a* and 6*b* which are provided such that they come into contact with one surface of the thermistor film 5, a second electrode 6*c* which is provided such that it comes into contact with the other surface of the thermistor film 5, and insulating films 7*a*, 7*b*, and 7*c* which serve as electromagnetic wave absorbers covering at least a part of the thermistor film 5 (in its entirety, in the present embodiment). The thermistor elements 4 have a current-perpendicular-to-plane (CPP) structure in which a current flows in a perpendicular-to-plane direction of the thermistor film 5. The insulating film 7*b* is provided on a side of the pair of first electrodes 6*a* and 6*b* opposite to the side in contact with the thermistor film 5.

That is, in this thermistor element 4, a current can flow from the first electrode 6*a* on one side toward the second electrode 6*c* in the perpendicular-to-plane direction of the thermistor film 5 and a current can flow from the second electrode 6*c* toward the first electrode 6*b* on the other side in the perpendicular-to-plane direction of the thermistor film 5.

Regarding the thermistor film 5, for example, oxide having a spinel-type crystal structure including vanadium oxide, amorphous silicon, polycrystalline silicon, and manganese; titanium oxide; yttrium-barium-copper oxide; or the like can be used.

Regarding the first electrodes 6*a* and 6*b* and the second electrode 6*c*, for example, conductive films made of platinum (Pt), gold (Au), palladium (Pd), ruthenium (Ru), silver (Ag), rhodium (Rh), iridium (Ir), osmium (Os), or the like can be used.

Regarding the insulating films 7*a*, 7*b*, and 7*c*, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The insulating films 7*a*, 7*b*, and 7*c* need only be constituted to be provided such that at least a part of at least the thermistor film 5 is covered. In the present embodiment, the insulating films 7*a*, 7*b*, and 7*c* are provided such that both surfaces of the thermistor film 5 are covered.

The thermistor elements 4 are formed to have the same size as each other. In addition, the thermistor elements 4 are arranged in an array within a plane parallel to the first substrate 2 and the second substrate 3 (which will hereinafter be referred to as "within a particular plane"). That is, the thermistor elements 4 are disposed side by side in a matrix in the first direction X and the second direction Y intersecting (orthogonal to, in the present embodiment) each other within the particular plane.

In addition, the thermistor elements 4 are disposed side by side with a uniform gap therebetween in the first direction X and are disposed side by side with a uniform gap therebetween in the second direction Y while having the first direction X as a row direction and having the second direction Y as a column direction.

Examples of the numbers of rows and columns of the foregoing thermistor elements 4 include 640 rows×480 columns and 1,024 rows×768 columns, but the numbers of rows and columns thereof are not necessarily limited thereto and can be suitably changed.

On the first substrate 2 side, a first insulator layer 8 which serves as an intermediate layer, wirings 9 which are electrically connected to a circuit 15 (which will be described below), and first connecting parts 10 which electrically connect each of the thermistor elements 4 and the wirings 9 to each other are provided.

The first insulator layer 8 is provided on a side of a surface of the first substrate 2 facing arms 12*a* and 12*b* (a surface facing the second substrate 3). A part of the first insulator layer 8 faces at least a part of the arms 12*a* and 12*b*. The first insulator layer 8 is constituted of a laminated insulating film. Regarding the insulating film, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The wirings 9 have first lead wirings 9*a* and second lead wirings 9*b*. For example, the first lead wirings 9*a* and the second lead wirings 9*b* are constituted of conductive films made of copper, gold, or the like.

The first lead wirings 9*a* and the second lead wirings 9*b* are positioned inside different layers in the third direction Z of the first insulator layer 8 and are disposed such that they intersect each other in a three-dimensional manner. In these, the first lead wirings 9*a* extend in the first direction X and are provided side by side with a uniform gap therebetween in the second direction Y. On the other hand, the second lead wirings 9*b* extend in the second direction Y and are provided side by side with a uniform gap therebetween in the first direction X.

In a plan view, each of the thermistor elements 4 is provided in each region E demarcated by the first lead wirings 9*a* and the second lead wirings 9*b*. A window W allowing the infrared rays IR to be transmitted therethrough between the first substrate 2 and the thermistor film 5 is present in a region in which the thermistor film 5 and the first substrate 2 face each other in a thickness direction (an overlapping region in a plan view).

In addition, as illustrated in FIGS. 4 and 5, a hole 8*a* penetrating the first insulator layer 8 is provided in a part facing the thermistor element 4. In other words, a hole 8*a* penetrating the first insulator layer 8 is provided between the first substrate 2 and the thermistor element 4. The hole 8*a* is provided in a part facing the thermistor element 4 in a layer T in which the first insulator layer 8 is provided.

The first connecting parts 10 have a pair of first connection members 11*a* and 11*b* corresponding to each of the thermistor elements 4. In addition, the pair of first connection members 11*a* and 11*b* respectively have a pair of arms 12*a* and 12*b* and a pair of legs 13*a* and 13*b*.

Each of the arms 12*a* and 12*b* has a wiring layer 21. For example, the wiring layer 21 is formed using a conductor layer made of aluminum, tungsten, titanium, tantalum, titanium nitride, tantalum nitride, chromium nitride, zirconium nitride, or the like. In the examples illustrated in FIGS. 3 to 5, the wiring layer 21 having a bent-line shape is formed along the perimeter of the thermistor element 4. For example, each of the legs 13*a* and 13*b* is constituted of a conductor pillar having a circular cross section formed to extend in the third direction Z by plating of copper, gold, a FeCoNi alloy, a NiFe alloy (Permalloy), or the like.

The first connection member 11*a* on one side has the wiring layer 21 which is included in the arm 12*a* on one side electrically connected to the first electrode 6*a* on one side, and the leg 13*a* on one side which electrically connects the wiring layer 21 included in this arm 12*a* on one side and the first lead wiring 9*a* to each other, thereby electrically connecting the first electrode 6*a* on one side and the first lead wiring 9*a* to each other.

The first connection member 11*b* on the other side has the wiring layer 21 which is included in the arm 12*b* on the other side electrically connected to the first electrode 6*b* on the other side, and the leg 13*b* on the other side which electrically connects the wiring layer 21 included in this arm 12*b* on the other side and the second lead wirings 9*b* to each other, thereby electrically connecting the first electrode 6*b* on the other side and the second lead wirings 9*b* to each other.

Accordingly, the thermistor element 4 is supported in a state of being hung in the third direction Z with respect to the first substrate 2 by the pair of first connection members 11*a* and 11*b* positioned in a diagonal direction within the plane thereof. In addition, a space G is provided between the thermistor element 4 and the first insulator layer 8.

Although illustration thereof is omitted, selection transistors (not illustrated) for selecting one thermistor element 4 from the thermistor elements 4 is provided on a side of one surface of the first substrate 2 (a surface facing the second substrate 3). Each of the selection transistors is provided at a position of the first substrate 2 corresponding to each of the thermistor elements 4. In addition, each of the selection transistors is provided at a position avoiding the window W described above in order to prevent irregular reflection of the infrared rays IR or deterioration in efficiency of incidence.

On the second substrate 3 side, a second insulator layer 14, the circuit 15 which detects a variance in voltage output from the thermistor element 4 and converts it into a brightness temperature, and a second connecting part 16 which electrically connects each of the thermistor elements 4 and the circuit 15 to each other are provided.

The second insulator layer 14 is constituted of an insulating film laminated on a side of one surface of the second substrate 3 (a surface facing the first substrate 2). Regarding the insulating film, the same insulating film as that exemplified in the foregoing first insulator layer 8 can be used.

The circuit 15 is constituted of a read-out integrated circuit (ROIC), a regulator, an analog-to-digital converter (A/D converter), a multiplexer, and the like and is provided inside the second insulator layer 14.

In addition, connection terminals 17*a* and connection terminals 17*b* corresponding to the first lead wirings 9*a* and the second lead wirings 9*b*, respectively, are provided on a surface of the second insulator layer 14. For example, the connection terminals 17*a* and 17*b* are constituted of conductive films made of copper, gold, or the like.

The connection terminals 17*a* on one side are positioned in a region on one side in the first direction X surrounding the perimeter of the circuit 15 and are provided side by side with a uniform gap therebetween in the second direction Y. The connection terminals 17*b* on the other side are positioned in a region on one side in the second direction Y surrounding the perimeter of the circuit 15 and are provided side by side with a uniform gap therebetween in the first direction X.

The second connecting part 16 has second connection members 18*a* and second connection members 18*b* corresponding to the first lead wirings 9*a* and second lead wirings 9*b*, respectively. For example, the second connection members 18*a* and 18*b* are constituted of conductor pillars having a circular cross section formed to extend in the third direction Z by plating of copper, gold, or the like.

The second connection members 18*a* on one side electrically connect one end sides of the first lead wirings 9*a* and the connection terminals 17*a* on one side to each other. The second connection members 18*b* on the other side electrically connect one end sides of the second lead wirings 9*b* and the connection terminals 17*b* on the other side to each other. Accordingly, the first lead wirings 9*a* and the circuit 15 are electrically connected to each other via the second connection members 18*a* on one side and the connection terminals 17*a* on one side. In addition, the second lead wirings 9*b* and the circuit 15 are electrically connected to each other via the second connection members 18*b* on the other side and the connection terminals 17*b* on the other side.

An antireflection layer 19 is provided on a side of a surface of the first substrate 2 facing the thermistor element 4. In the present embodiment, the antireflection layer 19 is provided between the first substrate 2 and the first insulator layer 8. At least a part of the antireflection layer 19 faces at least a part of the thermistor element 4. The antireflection layer 19 prevents reflection of the infrared rays IR on a boundary surface between the first substrate 2 and the space G while the infrared rays IR discharged from a measurement object are incident on the thermistor film 5 from the first substrate 2 side through the window W and causes the infrared rays IR transmitted through the first substrate 2 to be efficiently incident on the thermistor film 5 side.

Regarding the antireflection layer 19, for example, zinc sulfide, yttrium fluoride, chalcogenide glass, germanium, silicon, zinc selenide, gallium arsenide, or the like can be used.

In addition, the antireflection layer 19 may have a constitution in which films having different refractive indices are alternately laminated and the reflection coefficient of the infrared rays IR is reduced utilizing interference of waves reflected by each layer. In this case, regarding the antireflection layer 19, in addition to the materials described above, for example, a lamination film in which an oxide film, a nitride film, a sulfide film, a fluoride film, a boride film, a bromide film, a chloride film, a selenide film, a Ge film, a diamond film, a chalcogenide film, a Si film, or the like is laminated can be used.

In the electromagnetic wave sensor 1 of the present embodiment having the foregoing constitution, the infrared rays IR discharged from a measurement object are incident on the thermistor element 4 from the first substrate 2 side through the window W.

In the thermistor element 4, the infrared rays IR incident on the insulating films 7*a*, 7*b*, and 7*c* formed in the vicinity of the thermistor film 5 are absorbed by the insulating films 7*a*, 7*b*, and 7*c* and the infrared rays IR incident on the thermistor film 5 are absorbed by the thermistor film 5 so that the temperature of this thermistor film 5 varies. In addition, in the thermistor element 4, an output voltage between the pair of first electrodes 6*a* and 6*b* varies in accordance with a variance in electrical resistance of this thermistor film 5 with respect to the variance in temperature of the thermistor film 5. In the electromagnetic wave sensor 1 of the present embodiment, the thermistor elements 4 function as bolometer elements.

In the electromagnetic wave sensor 1 of the present embodiment, after the infrared rays IR discharged from a measurement object are detected by the thermistor elements 4 in a planar manner, an electrical signal (voltage signal) output from each of the thermistor elements 4 is converted into a brightness temperature so that the temperature distribution of the measurement object (temperature image) can be detected (image-captured) in a two-dimensional manner.

In the thermistor elements 4, when a constant voltage is applied to the thermistor film 5, a variance in current flowing in the thermistor film 5 can also be detected and converted into a brightness temperature with respect to a variance in temperature of this thermistor film 5.

[Structure Body]

Next, regarding the embodiment of the present disclosure, for example, the structure body 20 illustrated in FIGS. 3 to 6 will be described.

Figure 6:
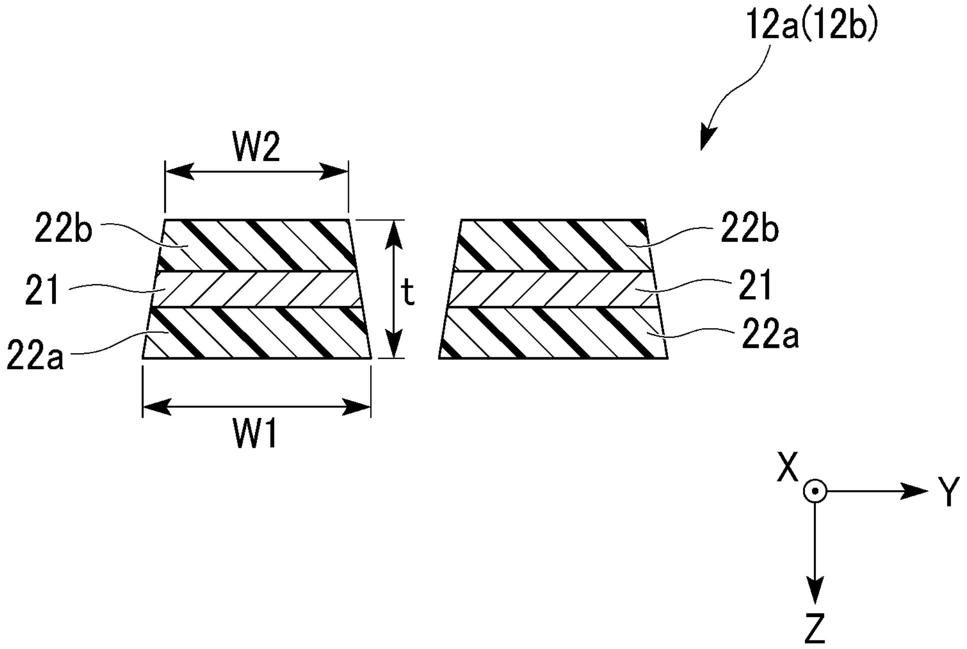
FIG. 6 is an enlarged cross-sectional view of an arm included in the structure body illustrated in FIG. 5.

FIG. 6 is an enlarged cross-sectional view of the arm 12*a* or 12*b* included in the structure body 20.

As illustrated in FIGS. 3 to 6, the structure body 20 of the present embodiment includes the thermistor element 4 which serves as an electromagnetic wave detector, and a pair of arms 12*a* and 12*b* which are positioned on both sides with the thermistor element 4 interposed therebetween, and it has a structure in which the thermistor element 4 is hung with respect to the first substrate 2 facing the thermistor element 4 via the pair of arms 12*a* and 12*b*.

Each of the arms 12*a* and 12*b* has a line shape. Each of the arms 12*a* and 12*b* has the wiring layer 21 which is in a line shape and electrically connected to the thermistor film 5 provided in the thermistor element 4, and protective layers 22*a* and 22*b* of which parts are disposed on respective surfaces of the wiring layer 21. The shape of each of the protective layers 22*a* and 22*b* is a line shape matching the shape of the wiring layer 21. In addition, the protective layers 22*a* and 22*b* are made of a material having a lower heat conductivity than the wiring layer 21.

The protective layers 22*a* and 22*b* are constituted of the insulating films 7*a*, 7*b*, and 7*c* covering the thermistor film 5 described above. In these, the protective layer (which will hereinafter be distinguished as "a first protective layer") 22*a* disposed on one surface side of the wiring layer 21 is constituted of the insulating film 7*a*, and the protective layer (which will hereinafter be distinguished as "a second protective layer") 22*b* disposed on the other surface side of the wiring layer 21 is constituted of the insulating films 7*b* and 7*c*. In the following description, as illustrated in FIG. 6, illustration of the insulating films 7*a*, 7*b*, and 7*c* described above is omitted, and they will be illustrated as the protective layers 22*a* and 22*b*.

The pair of arms 12*a* and 12*b* are positioned on both sides with the thermistor element 4 interposed therebetween in a plan view. In the example illustrated in FIG. 3, in a plan view, the pair of arms 12*a* and 12*b* are disposed point-symmetrically with respect to the center of the thermistor element 4. In addition, each of the arms 12*a* and 12*b* has a part extending along the perimeter of at least the thermistor element 4 and a part coupled to the thermistor element 4.

Specifically, the arms 12*a* and 12*b* of the present embodiment have a structure in which parts (two parts, in the present embodiment) extending in the first direction X are disposed side by side in the second direction Y, and one end and the other end of parts adjacent to each other are folded and coupled via a part extending in the second direction Y. In addition, the pair of arms 12*a* and 12*b* are coupled to the thermistor element 4 at positions with the thermistor element 4 interposed therebetween via a part extending in the second direction Y.

Incidentally, in the structure body 20 of the present embodiment, area of a surface of the pair of arms 12*a* and 12*b* on a side facing the first substrate 2 are larger than area of a surface thereof on a side opposite to the side facing the first substrate 2.

Specifically, in this structure body 20, width W1 of the surface of the pair of arms 12*a* and 12*b* on a side facing the first substrate 2 in a traverse direction are larger than width W2 of the surface thereof on a side opposite to the side facing the first substrate 2 in the traverse direction. In addition, in this structure body 20, as illustrated in FIG. 6, area of a cross section perpendicular to the pair of arms 12*a* and 12*b* in an extending direction are smaller than the products of thickness t of the pair of arms 12*a* and 12*b* and the width W1. Moreover, in this structure body 20, as illustrated in FIGS. 4 to 6, cross sections of the arms 12*a* and 12*b* perpendicular to the extending direction have substantially a trapezoidal shape.

Moreover, in the structure body 20 of the present embodiment, a value obtained by dividing the area of a surface of the pair of arms 12*a* and 12*b* on a side facing the first substrate 2 by the area of a surface thereof on a side opposite to the side facing the first substrate 2 is larger than a value obtained by dividing area of a surface of the thermistor element 4 on a side facing the first substrate 2 by area of a surface thereof on a side opposite to the side facing the first substrate 2.

Here, an example of a step of forming the arms 12*a* and 12*b* will be described with reference to FIGS. 7 to 10. FIGS. 7 to 10 are explanatory cross-sectional views for examples of the step of forming the arms 12*a* and 12*b*.

Figure 7:
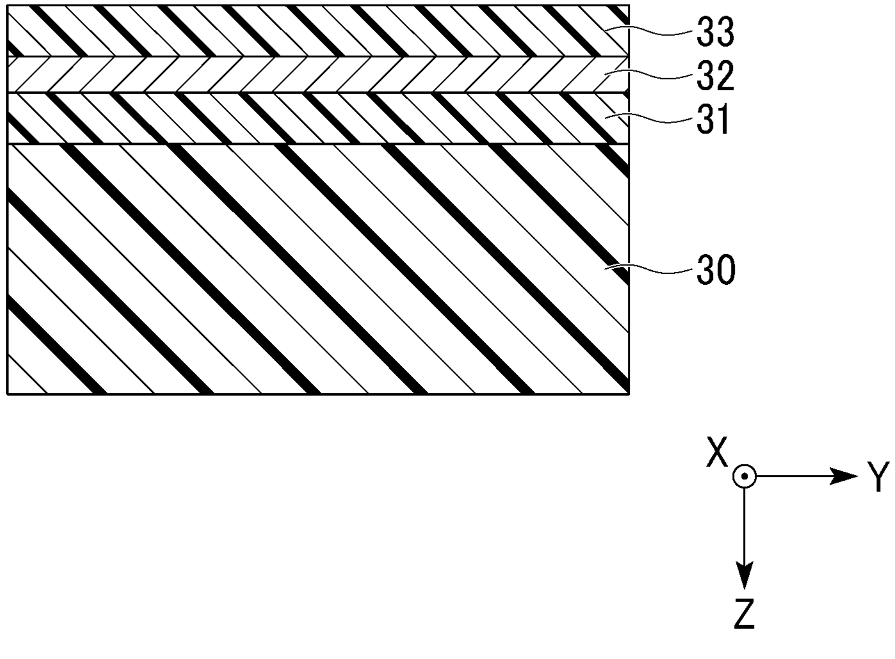
FIG. 7 is an explanatory cross-sectional view for an example of a step of forming the arm illustrated in FIG. 6.

In the step of forming the arms 12*a* and 12*b*, first, as illustrated in FIG. 7, an aluminum oxide ($Al_2O_3$) film 31 which serves as the first protective layer 22*a*, a titanium (Ti) film 32 which serves as the wiring layer 21, and an aluminum oxide ($Al_2O_3$) film 33 which serves as the second protective layer 22*b* are sequentially laminated on an organic sacrificial layer 30 which will be ultimately removed by ashing. The thickness of the $Al_2O_3$ film 31 is 2,000 Å, for example, and the thickness of the Ti film 32 is 600 Å, for example, and the thickness of the $Al_2O_3$ film 33 is 2,000 Å, for example.

Figure 8:
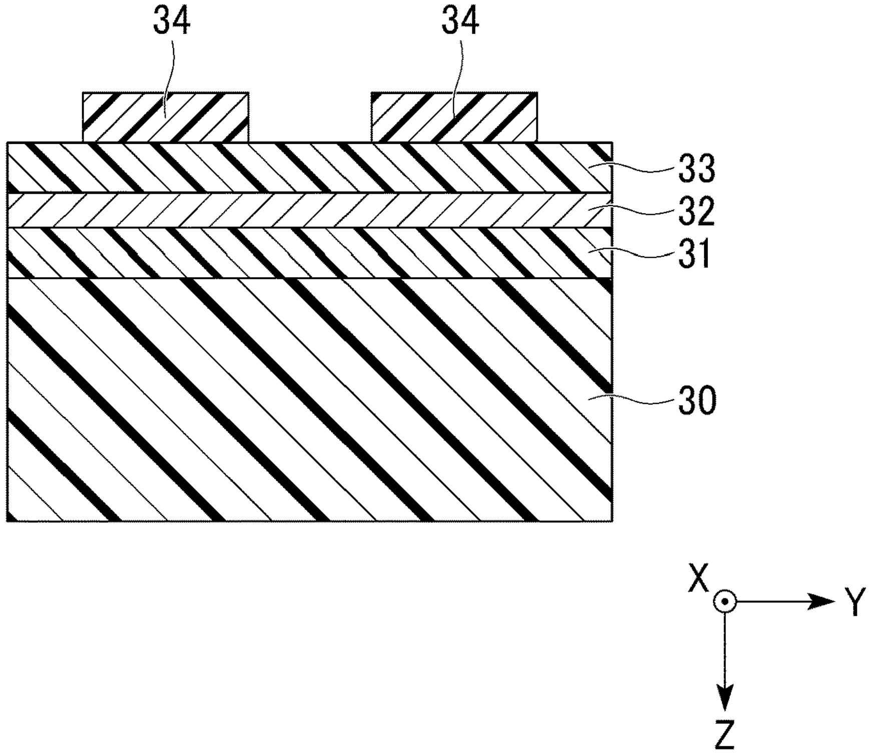
FIG. 8 is an explanatory cross-sectional view for an example of the step of forming the arm illustrated in FIG. 6.

Next, as illustrated in FIG. 8, on the $Al_2O_3$ film 33, after a metal film constituted of a nickel chromium (NiCr) film is formed, a mask layer 34 which is patterned into a shape corresponding to the arms 12*a* and 12*b* using a photolithography technique is formed.

Figure 9:
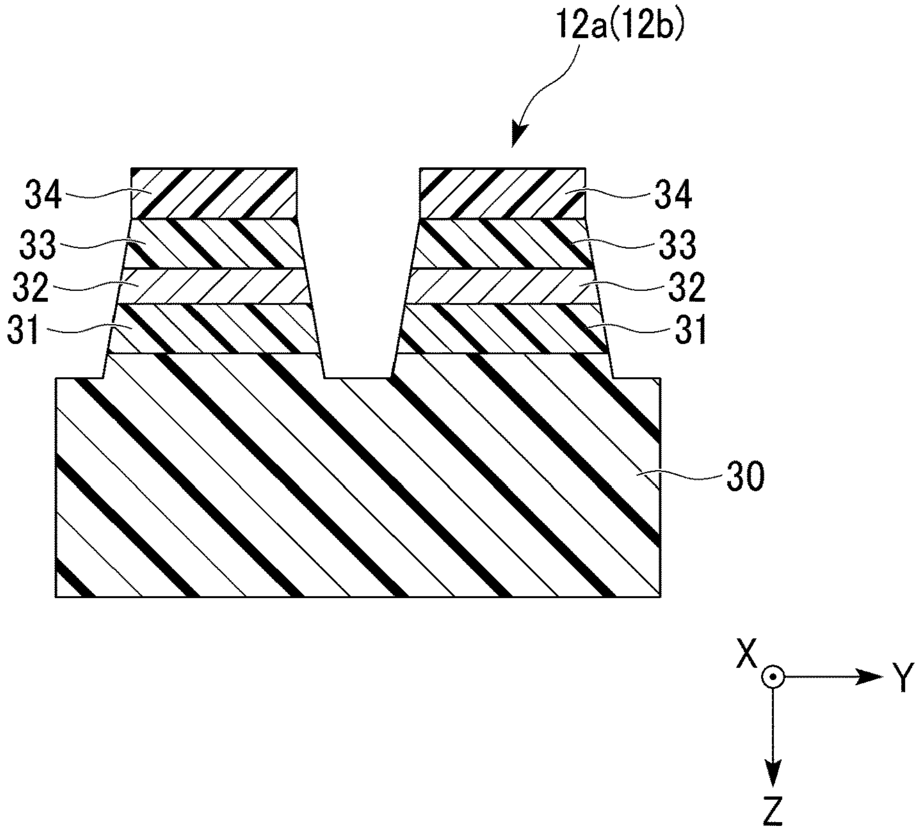
FIG. 9 is an explanatory cross-sectional view for an example of the step of forming the arm illustrated in FIG. 6.

Next, as illustrated in FIG. 9, the $Al_2O_3$ film 33, the Ti film 32, and the $Al_2O_3$ film 31 are patterned into shapes corresponding to the mask layer 34 by reactive ion etching (RIE) using chlorine (Cl) and boron chloride ($BCl_3$) as etching gases.

At this time, the shapes of the arms 12*a* and 12*b* after etching can be controlled by controlling a flow rate of etching gas, an RF power, a pressure, a stage temperature, and the like. For example, when the flow rate of Cl is set to 15 sccm, the flow rate of $BCl_3$ is set to 85 sccm, the RF power is set to 75 W, the pressure is set to 0.3 Pa, and the stage temperature is set to 50° C., anisotropy of the etching rate becomes high, and thus the $Al_2O_3$ film 33, the Ti film 32, and the $Al_2O_3$ film 31 can be etched in a perpendicular manner with respect to the film surface.

In contrast, when the flow rate of Cl is set to 15 sccm, the flow rate of $BCl_3$ is set to 85 sccm, the RF power is set to 50 W, the pressure is set to 0.3 Pa, and the stage temperature is set to 50° C., anisotropy of the etching rate becomes low, and thus the area of the $Al_2O_3$ film 31 on the lower layer side can become larger than the area of the $Al_2O_3$ film 33 on the upper layer side.

Figure 10:
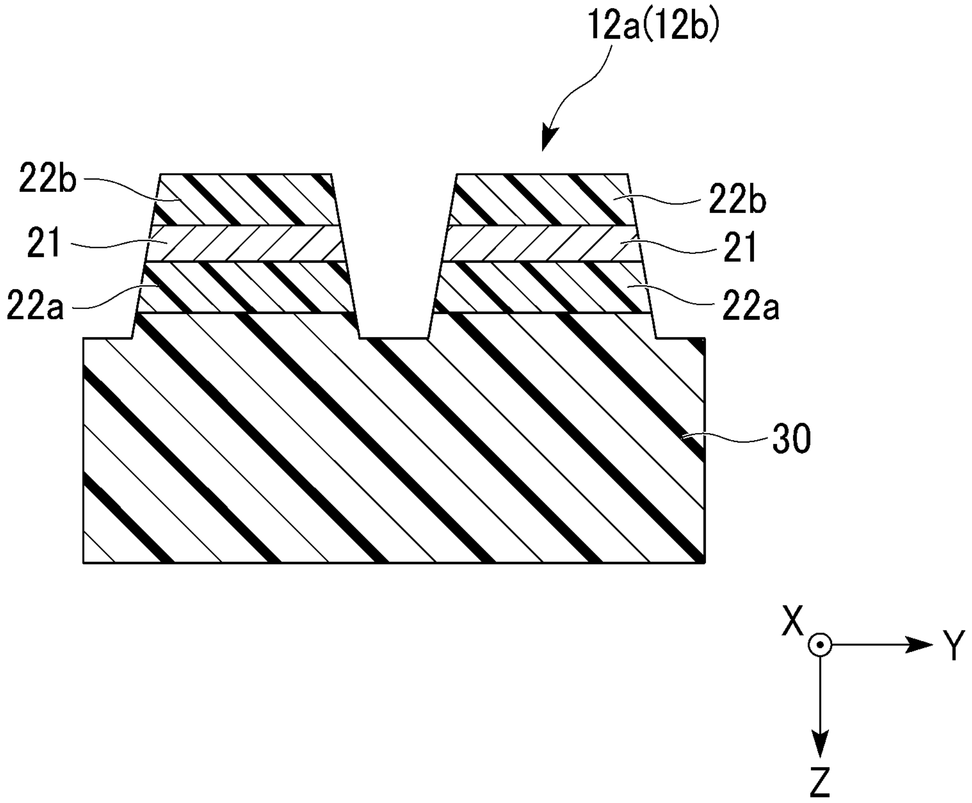
FIG. 10 is an explanatory cross-sectional view for an example of the step of forming the arm illustrated in FIG. 6.

Next, as illustrated in FIG. 10, the mask layer 34 is removed by dry milling. Accordingly, it is possible to form the arms 12*a* and 12*b* in which the area on the first protective layer 22*a* side is larger than the area on the second protective layer 22*b* side.

As above, in the structure body 20 of the present embodiment, the area of the surface of the pair of arms 12*a* and 12*b* on a side facing the first substrate 2 are larger the areas of the surfaces thereof on a side opposite to the side facing the first substrate 2.

Accordingly, in the structure body 20 of the present embodiment, while heat conduction of the arms 12*a* and 12*b* is curbed, the efficiency of absorption of electromagnetic waves (infrared rays IR) can be enhanced by keeping the cross-sectional area of the arms 12*a* and 12*b* small.

In the structure body 20 of the present embodiment, electromagnetic waves (infrared rays IR) are absorbed due to an interference absorption structure for electromagnetic waves (infrared rays IR) formed between the surfaces of the arms 12*a* and 12*b* on a side facing the first substrate 2, and the first substrate 2 (the first insulator layer 8 (intermediate layer) formed in the first substrate 2). Absorption of electromagnetic waves by the interference absorption structure increases as the amount of reflection of electromagnetic waves in each of the boundary surfaces included in the interference absorption structure increases. In the structure body 20 of the present embodiment, since the amount of reflection of electromagnetic waves (infrared rays IR) by the surfaces of the arms 12*a* and 12*b* on a side facing the first substrate 2 can be increased, the efficiency of absorption of electromagnetic waves (infrared rays IR) by this interference absorption structure can be enhanced.

In addition, in the structure body 20 of the present embodiment, the reflection coefficient of electromagnetic waves having a wavelength of 10 μm in parts of the arms 12*a* and 12*b* facing the first insulator layer 8 which serves as an intermediate layer is higher than the reflection coefficient of electromagnetic waves having a wavelength of 10 μm in a part of the antireflection layer 19 facing the thermistor element 4. The infrared rays IR in the present embodiment include electromagnetic waves having a wavelength of 10 μm. The reflection coefficient of the intermediate layer (or the antireflection layer) indicates a ratio of the intensity of light reflected from the intermediate layer (or the antireflection layer) to the intensity of light incident on the intermediate layer (or the antireflection layer). Light reflected from the intermediate layer (or the antireflection layer) is light in which reflected waves from the boundary surface of the intermediate layer (or the antireflection layer) are superimposed.

Accordingly, in the structure body 20 of the present embodiment, since the amount of reflection of electromagnetic waves (infrared rays IR) by the part of the first insulator layer 8 facing the arms 12*a* and 12*b* can be increased, the efficiency of absorption of electromagnetic waves (infrared rays IR) by the interference absorption structures for electromagnetic waves (infrared rays IR) in the part of the first insulator layer 8 facing the arms 12*a* and 12*b* and the arms 12*a* and 12*b* can be further enhanced.

Therefore, in the electromagnetic wave sensor 1 including the structure body 20 of the present embodiment, highly accurate and highly sensitive sensing by the thermistor element 4 can be performed by curbing heat conduction of the arms 12*a* and 12*b* described above and enhancing the efficiency of absorption of electromagnetic waves (infrared rays IR).

The present disclosure is not necessarily limited to the foregoing embodiment, and various changes can be added within a range not departing from the gist of the present disclosure.

Figure 11:
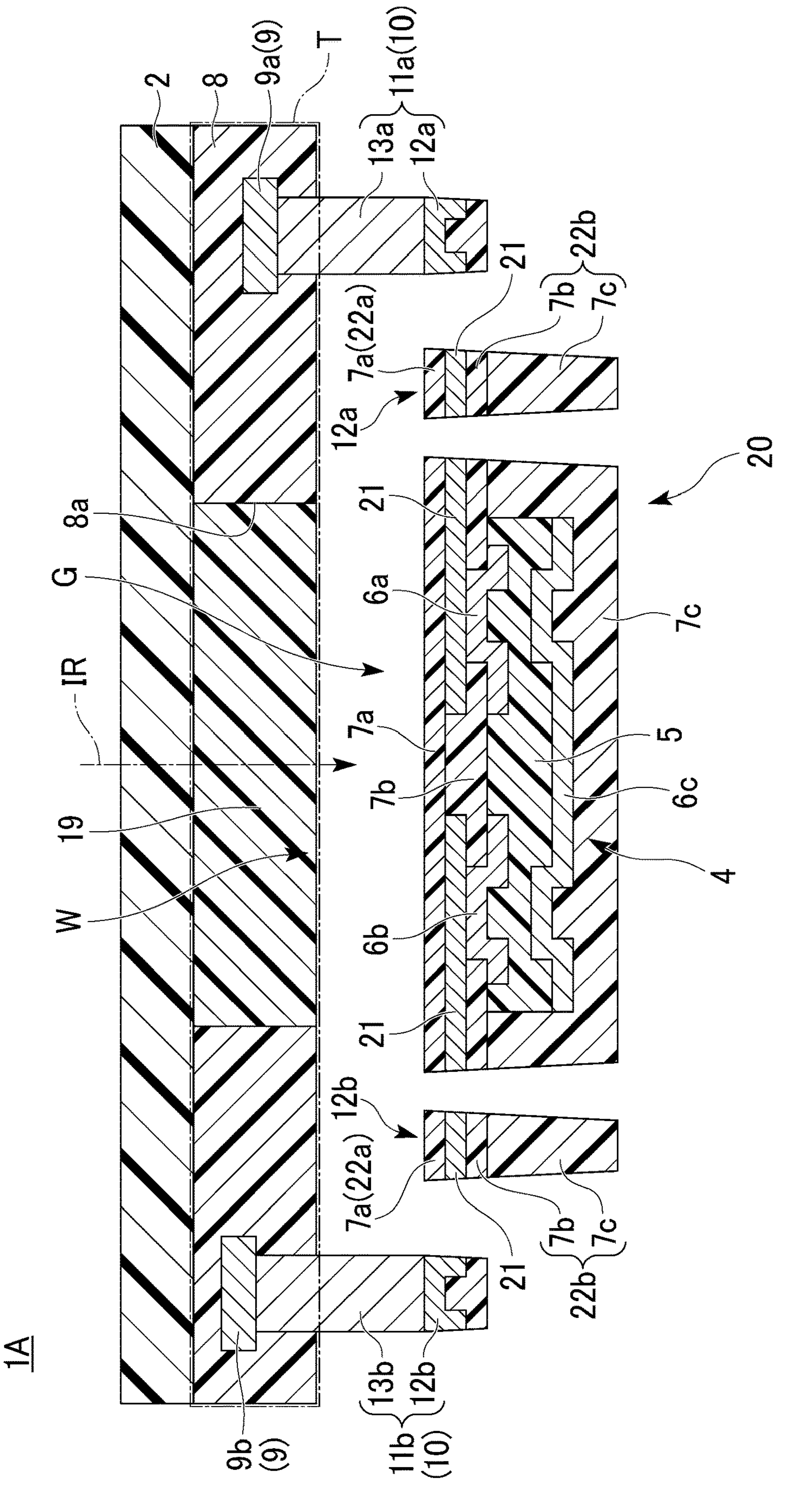
FIG. 11 is a cross-sectional view illustrating another example of a constitution of an electromagnetic wave sensor.

Specifically, in the foregoing embodiment, a constitution in which the antireflection layer 19 is provided between the first substrate 2 and the first insulator layer 8 has been exemplified. However, for example, as illustrated in FIG. 11, it is also possible to adopt an electromagnetic wave sensor 1A in which the antireflection layer 19 is provided in an embedded state on an inward side of the hole 8*a*. In the electromagnetic wave sensor 1A illustrated in FIG. 11, description of the same parts as in the foregoing electromagnetic wave sensor 1 is omitted, and the same reference signs are applied thereto in the drawings.

In the electromagnetic wave sensor 1A illustrated in FIG. 11 as well, the antireflection layer 19 is provided on a side of a surface of the first substrate 2 facing the thermistor element 4, and at least a part of the antireflection layer 19 faces at least a part of the thermistor element 4.

Figure 12:
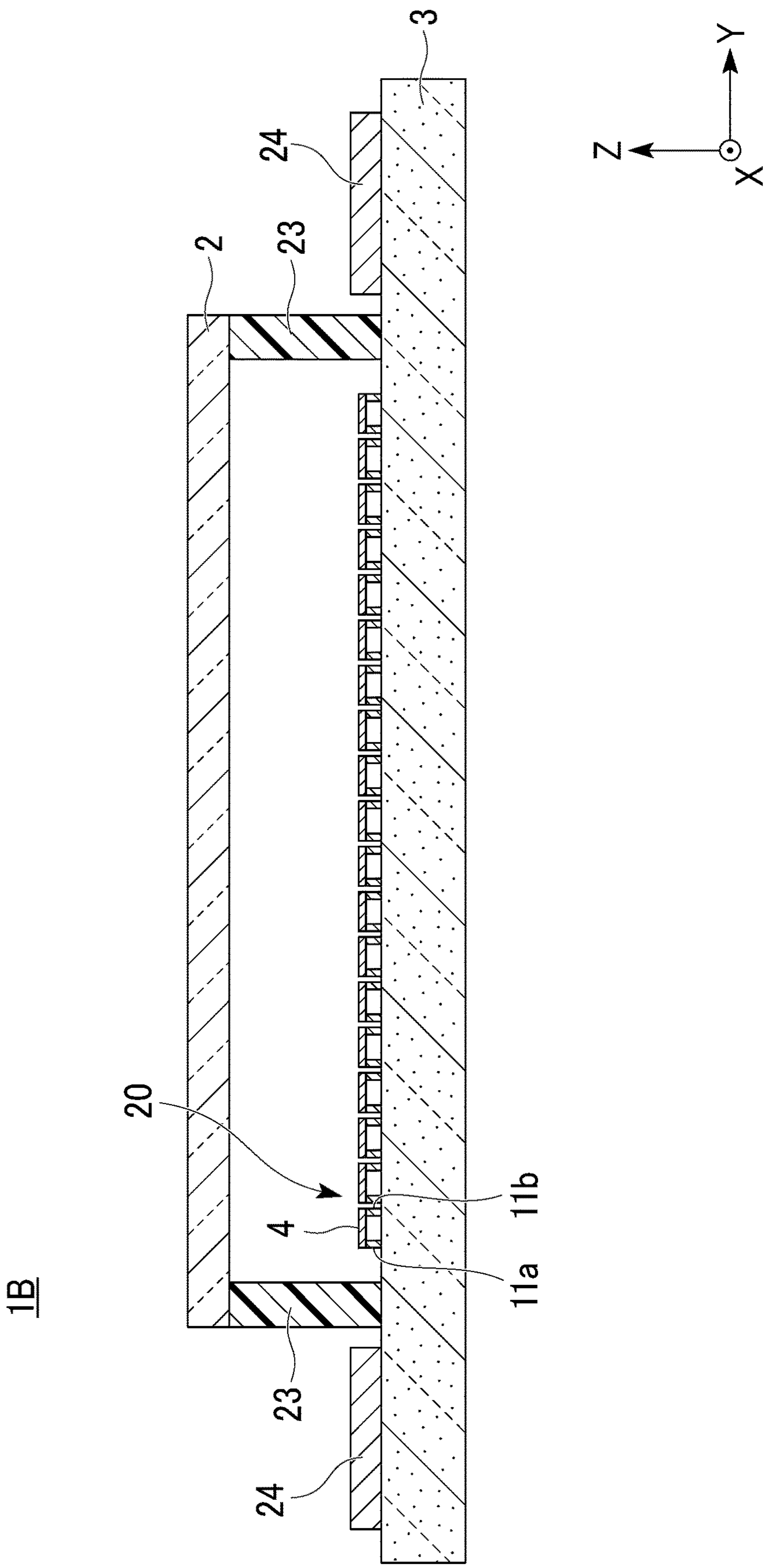
FIG. 12 is a cross-sectional view illustrating another example of a constitution of an electromagnetic wave sensor.

In addition, in the foregoing embodiment, the hanging-type electromagnetic wave sensor 1 in which the thermistor elements 4 are hung with respect to the first substrate 2 has been exemplified. However, for example, it is also possible to adopt a suspension-type electromagnetic wave sensor 18 in which the thermistor element 4 illustrated in FIG. 12 is suspended with respect to the second substrate 3. The example illustrated in FIG. 12 has a structure in which the thermistor element 4 serving as an electromagnetic wave detector is suspended with respect to the second substrate 3 facing the thermistor element 4. In the electromagnetic wave sensor 1B illustrated in FIG. 12, description of the same parts as in the foregoing electromagnetic wave sensor 1 is omitted, and the same reference signs are applied thereto in the drawings.

In this case, for example, the first connection members 11*a* and 11*b* are directly connected to a read-out circuit (ROIC) provided in the second substrate 3 without using the second connection members 18*a* and 18*b* and the wirings 9. In the example illustrated in FIG. 12, the thermistor elements 4 are disposed inside a space hermetically sealed by the first substrate 2, a seal member 23, and the second substrate 3, and electrode pads 24 electrically connected to the read-out circuit (ROIC) are disposed outside the space.

In the electromagnetic wave sensor 1B, the area of the surface of the pair of arms 12*a* and 12*b* on a side facing the second substrate 3 are larger than the area of the surface thereof on a side opposite to the side facing the second substrate 3. Specifically, in the electromagnetic wave sensor 1B, the width of the surface of the pair of arms 12*a* and 12*b* on a side facing the second substrate 3 in the traverse direction are larger than the width of the surface thereof on a side opposite to the side facing the second substrate 3 in the traverse direction. The area of the cross section of the pair of arms 12*a* and 12*b* perpendicular to the extending direction are smaller than the products of the thickness of the pair of arms 12*a* and 12*b* and the widths of the surfaces thereof on a side facing the second substrate 3 in the traverse direction. In addition, a value obtained by dividing the area of the surface of the pair of arms 12*a* and 12*b* on a side facing the second substrate 3 by the area of the surface thereof on a side opposite to the side facing the second substrate 3 is larger than a value obtained by dividing the area of the surface of the thermistor element 4 on a side facing the second substrate 3 by the area of the surface thereof on a side opposite to the side facing the second substrate 3.

In the structure body 20 included in the electromagnetic wave sensor 1B as well, while heat conduction of the arms 12*a* and 12*b* is curbed, the efficiency of absorption of electromagnetic waves (infrared rays IR) can be enhanced by keeping the cross-sectional area of the arms 12*a* and 12*b* small. In the structure body 20 included in the electromagnetic wave sensor 1B, electromagnetic waves (infrared rays IR) are absorbed due to the interference absorption structure for electromagnetic waves (infrared rays IR) formed between the surfaces of the arms 12*a* and 12*b* on a side facing the second substrate 3, and the second substrate 3. In the structure body 20 included in the electromagnetic wave sensor 1B, since the amount of reflection electromagnetic waves (infrared rays IR) by the surfaces of the arms 12*a* and 12*b* on a side facing the second substrate 3 can be increased, the efficiency of absorption of electromagnetic waves (infrared rays IR) by this interference absorption structure can be enhanced.

The electromagnetic wave sensor having the present disclosure applied thereto is not necessarily limited to the constitution of an infrared image sensor in which the thermistor elements 4 described above are arranged in an array, and the present disclosure can also be applied to an electromagnetic wave sensor in which a single thermistor element 4 is used, an electromagnetic wave sensor in which thermistor elements 4 are arranged side by side in a line shape, and the like. In addition, the thermistor elements 4 can also be used as temperature sensors for measuring a temperature.

In addition, the electromagnetic wave sensor having the present disclosure applied thereto is not necessarily limited to a sensor for detecting infrared rays described above as electromagnetic waves. For example, it may be a sensor for detecting terahertz waves having a wavelength within a range of 30 μm to 3 mm.

In addition, the electromagnetic wave sensor having the present disclosure applied thereto is not necessarily limited to a sensor using the thermistor elements 4 described above as electromagnetic wave detectors. For example, in place of the thermistor film 5, a sensor using a temperature detection element such as a thermopile-type (thermocouple-type), a pyroelectric-type, or a diode-type can be used as an electromagnetic wave detector.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A structure body comprising:

an electromagnetic wave detector; and a pair of arms that are positioned on both sides with the electromagnetic wave detector interposed therebetween, wherein the electromagnetic wave detector includes a temperature detection element and an electromagnetic wave absorber which covers at least a part of the temperature detection element, wherein the structure body has a structure in which the electromagnetic wave detector is hung or suspended with respect to a substrate facing the electromagnetic wave detector via the pair of arms, wherein area of a surface of the pair of arms on a side facing the substrate is larger than area of a surface thereof on a side opposite to the side facing the substrate, wherein the arms have a linear shape, and wherein a width of each of the arms gradually narrows from an end of each of the arms on the side facing the substrate to an end of each of the arms on the side opposite to the side facing the substrate.

2. The structure body according to claim 1, wherein a value obtained by dividing the area of the surface of the pair of arms on the side facing the substrate by the area of the surface thereof on the side opposite to the side facing the substrate is larger than a value obtained by dividing area of a surface of the electromagnetic wave detector on the side facing the substrate by area of a surface thereof on the side opposite to the side facing the substrate.

3. The structure body according to claim 1 further comprising:

an intermediate layer that is provided on a side of a surface of the substrate facing the pair of arms; and an antireflection layer that is provided on a side of a surface of the substrate facing the electromagnetic wave detector, wherein a reflection coefficient of electromagnetic waves having a wavelength of 10 μm in a part of the intermediate layer facing the pair of arms is higher than a reflection coefficient of electromagnetic waves having a wavelength of 10 μm in a part of the antireflection layer facing the electromagnetic wave detector.

4. The structure body according to claim 3, wherein a hole penetrating the intermediate layer is formed in a part facing the electromagnetic wave detector in a layer in which the intermediate layer is provided.

5. An electromagnetic wave sensor comprising: at least one structure body according to claim 1.

6. The electromagnetic wave sensor according to claim 5, wherein the at least one structure body comprises a plurality of structure bodies, and wherein the structure bodies are arranged in an array.

* * * * *